(12) United States Patent
Lee et al.

(10) Patent No.: US 8,911,316 B2
(45) Date of Patent: Dec. 16, 2014

(54) POWER TRANSMISSION SYSTEM OF HYBRID ELECTRIC VEHICLE

(71) Applicant: Hyundai Motor Company, Seoul (KR)

(72) Inventors: Chang Wook Lee, Suwon-si (KR); Jongsool Park, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/058,127

(22) Filed: Oct. 18, 2013

(65) Prior Publication Data

US 2014/0148292 A1    May 29, 2014

(30) Foreign Application Priority Data

Nov. 26, 2012    (KR) .................. 10-2012-0134734

(51) Int. Cl.
  *F16H 3/72* (2006.01)
  *B60K 6/547* (2007.10)

(52) U.S. Cl.
  CPC .............. *B60K 6/547* (2013.01); *Y10S 903/902* (2013.01); *Y02T 10/6239* (2013.01); *Y02T 10/6295* (2013.01)
  USPC .............................................. 475/5; 903/902

(58) Field of Classification Search
  None
  See application file for complete search history.

(56) References Cited

U.S. PATENT DOCUMENTS

| 6,558,283 | B1 * | 5/2003 | Schnelle | 475/5 |
| 6,793,600 | B2 * | 9/2004 | Hiraiwa | 475/5 |
| 7,988,579 | B2 * | 8/2011 | Tabata et al. | 475/5 |
| 8,226,515 | B2 | 7/2012 | Phillips | |

FOREIGN PATENT DOCUMENTS

| JP | 4007403 B1 | 11/2007 |
| KR | 10-1163822 B1 | 7/2012 |

* cited by examiner

*Primary Examiner* — Robert A Siconolfi
*Assistant Examiner* — Huan Le
(74) *Attorney, Agent, or Firm* — McDermott Will & Emery LLP

(57) ABSTRACT

A power transmission system of a hybrid electric vehicle may include an input and output shaft. A first planetary gear set disposed on the input shaft includes a first rotation element connected to a first motor/generator, a second rotation element operated as an output element, and a third rotation element connected to the input shaft. A second planetary gear set includes a fourth rotation element connected to a second motor/generator, a fifth rotation element connected to the second rotation element and the output shaft, and a sixth rotation element connected to the first rotation element. A direct-coupling device connects two rotation elements of the second planetary gear set, and transfer gears connect two rotation elements of the first planetary gear set with the two rotation elements of the second planetary gear set. Friction elements connect a selected rotation element to a transfer gear or to the transmission housing.

20 Claims, 14 Drawing Sheets

FIG. 2

| mode | shift-speed | friction element |||
|---|---|---|---|---|
| | | CL1 | CL2 | BK |
| EV | 1ST | | | ● |
| | 2ND | ● | | |
| hybrid input split | 1ST | | | ● |
| | 2ND | ● | | |
| hybrid compound split | - | | ● | |
| engine | 1ST | | ● | ● |
| | 2ND | ● | ● | |

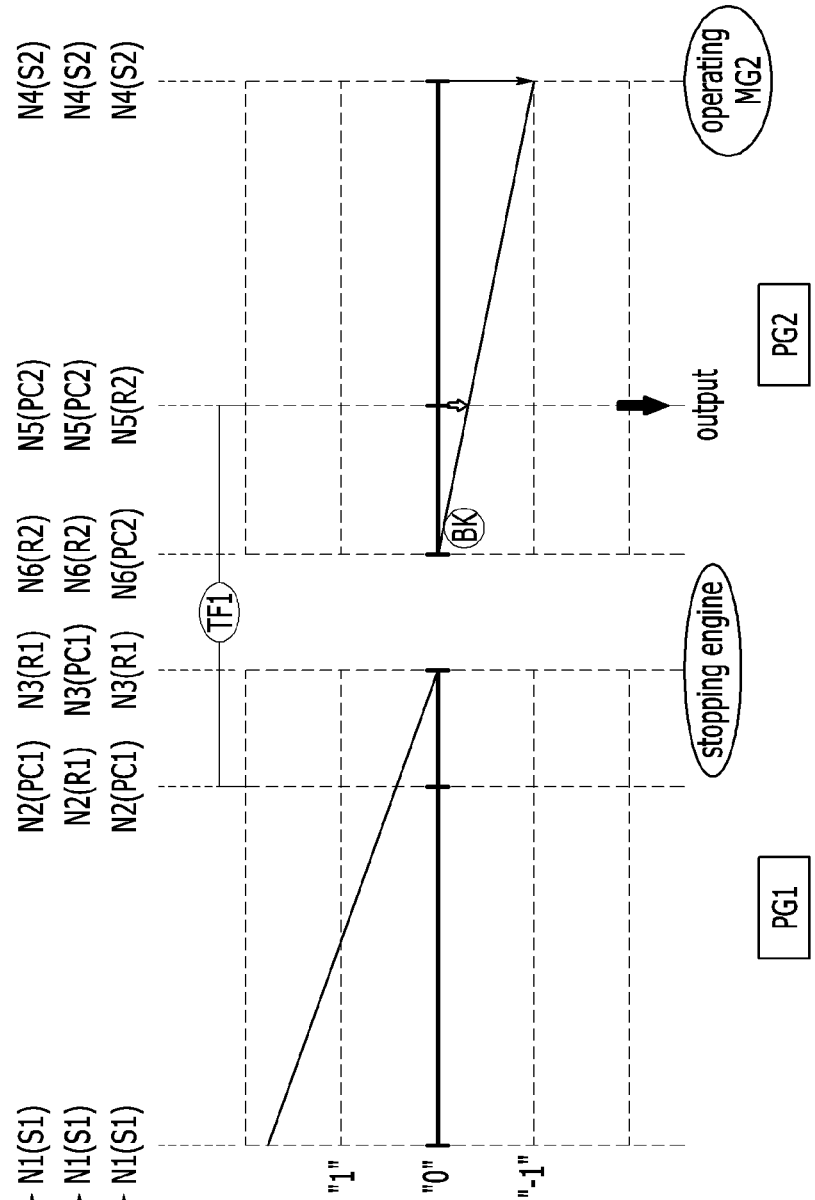

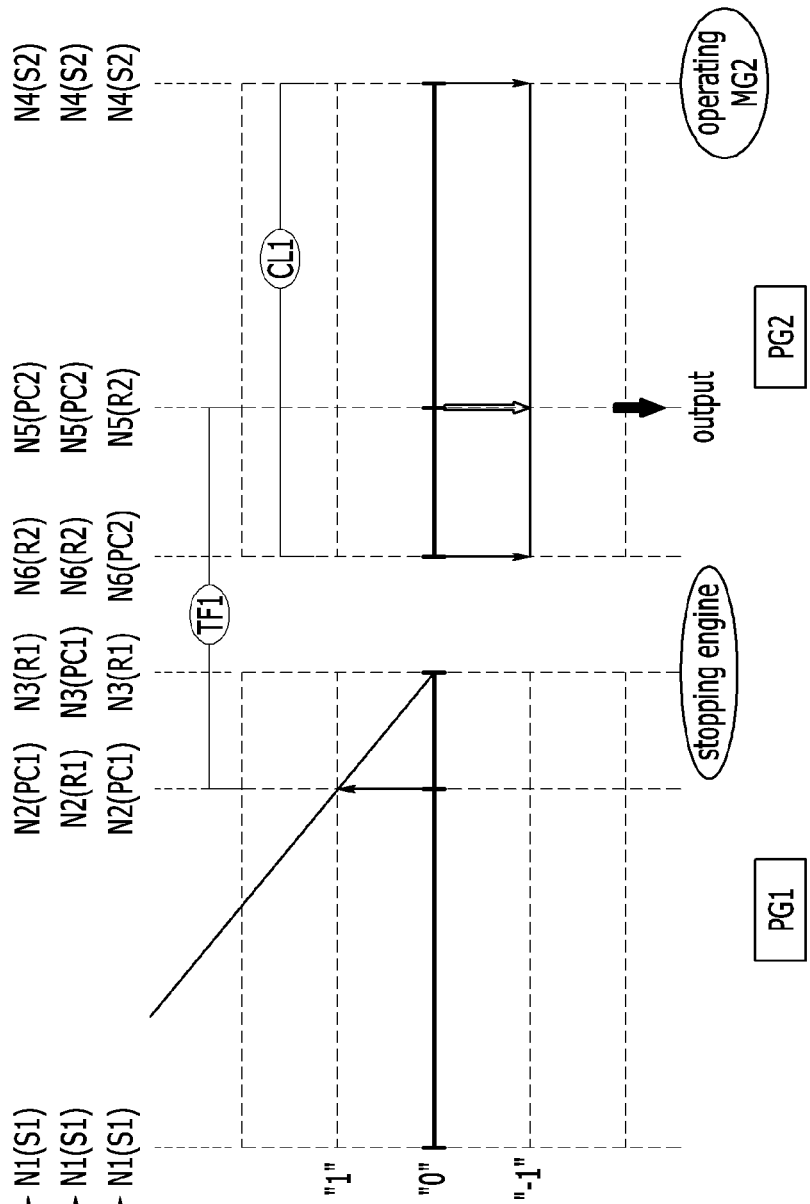

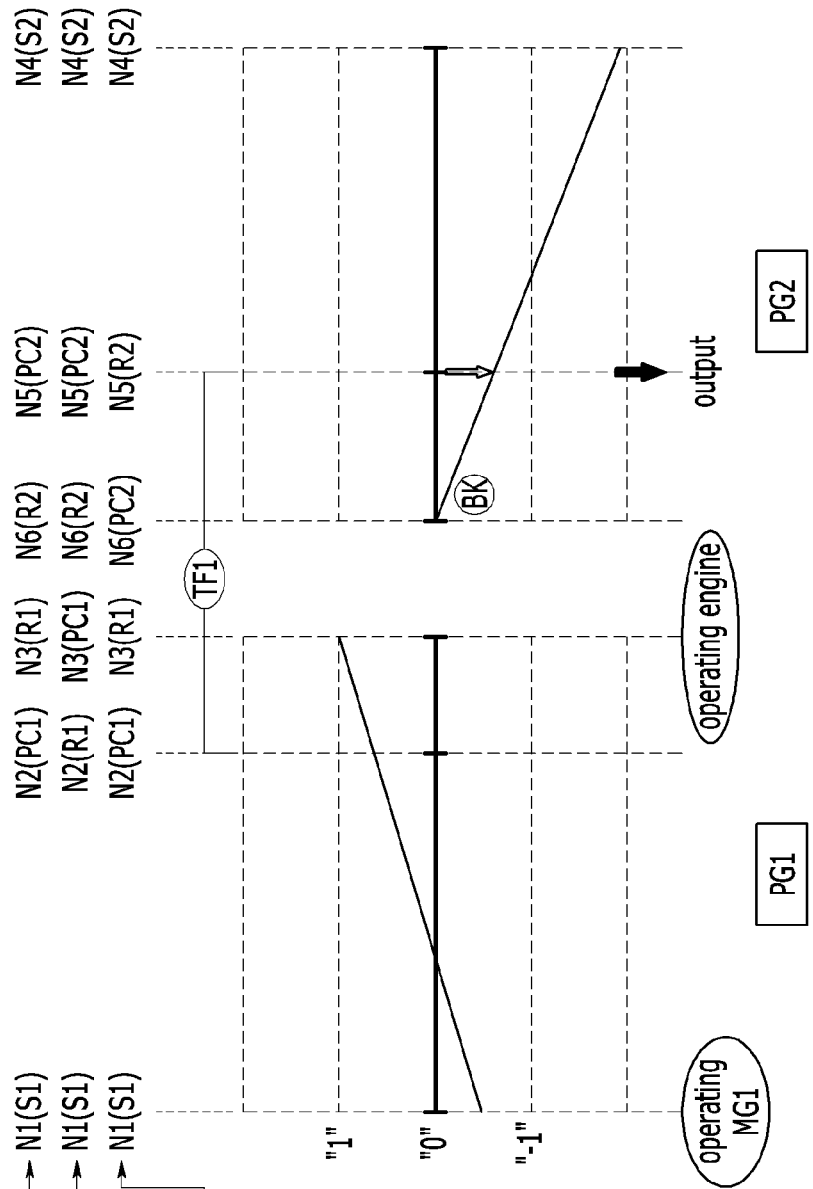

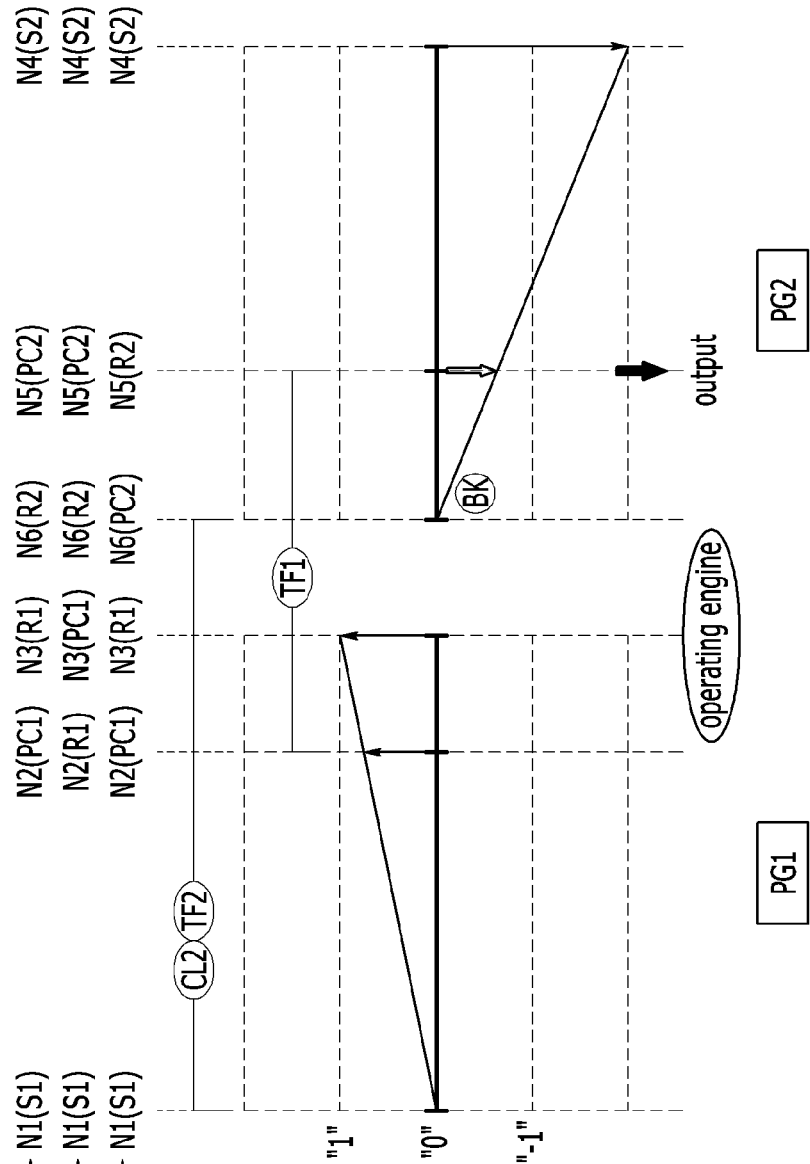

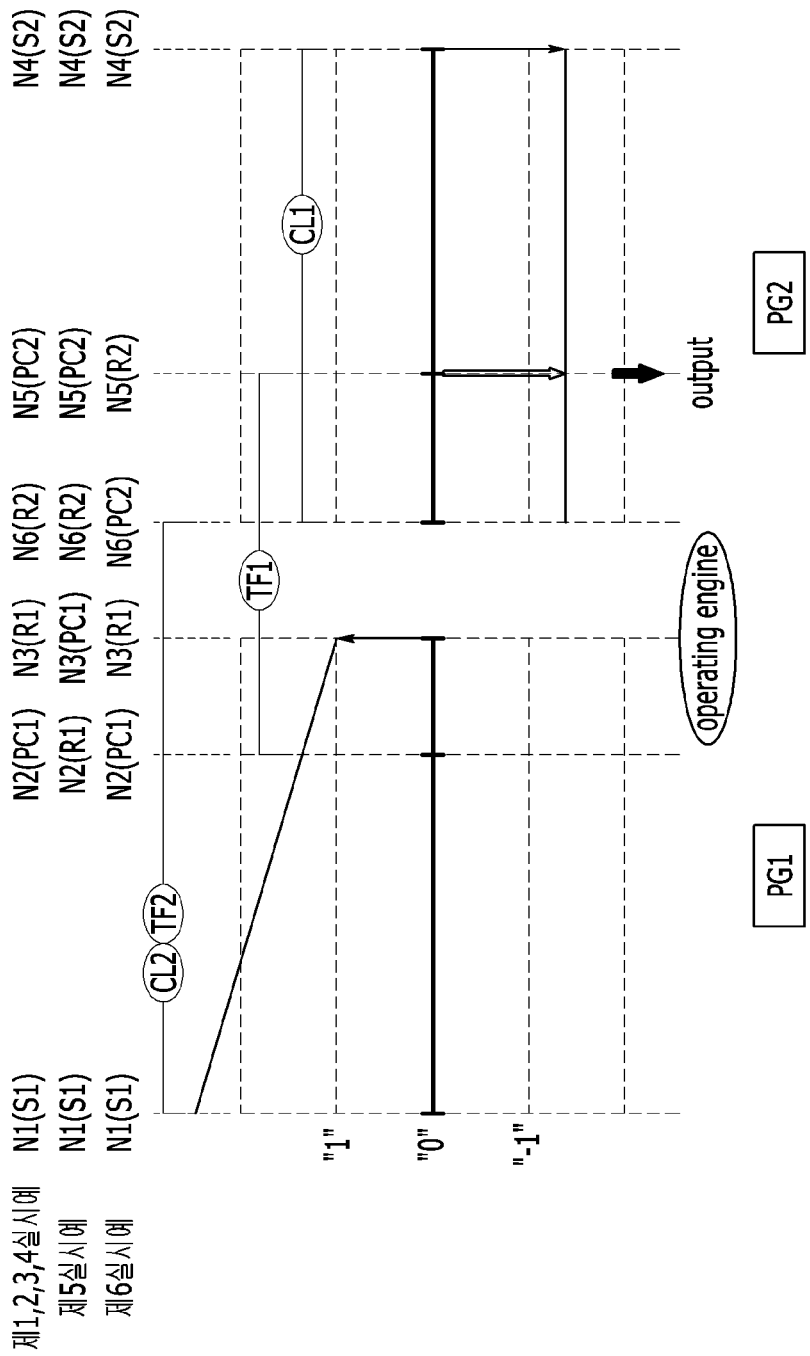

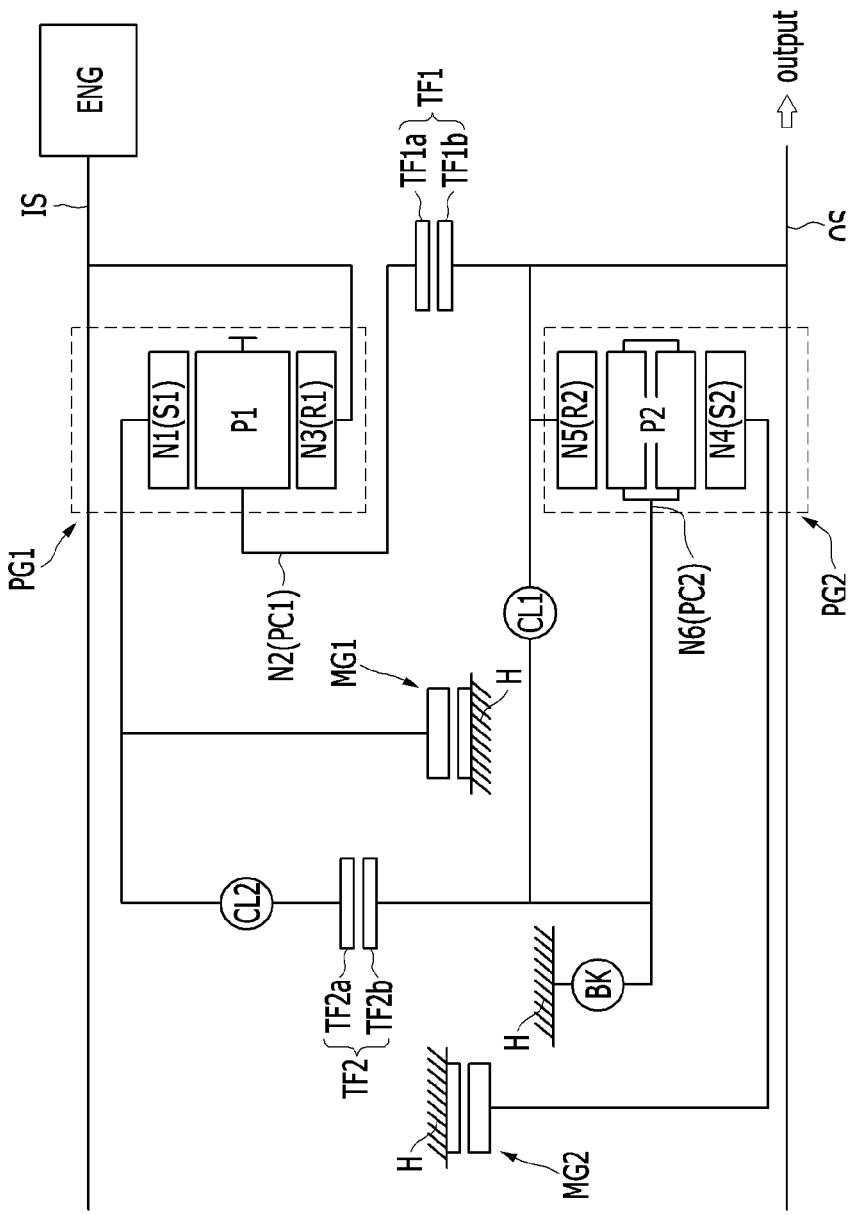

POWER TRANSMISSION SYSTEM OF HYBRID ELECTRIC VEHICLE

CROSS-REFERENCE TO RELATED APPLICATION

This application claims the benefit of priority to Korean Patent Application No. 10-2012-0134734 filed in the Korean Intellectual Property Office on Nov. 26, 2012, the entire contents of which are incorporated herein by reference.

TECHNICAL FIELD

The present disclosure relates to a power transmission system of a hybrid electric vehicle. More particularly, the present disclosure relates to a power transmission system of a hybrid electric vehicle which reduces electric load and uses maximum power of an engine by giving more importance on mechanical power delivery path when splitting engine power, decreases the number of mode conversions when starting the vehicle, and minimizes change in rotation speed of all the rotation elements when converting modes.

BACKGROUND

Environmentally-friendly vehicles are important on which survival of future motor industry is dependent. Vehicle manufacturers are focusing on development of environmentally-friendly vehicles so as to meet environment and fuel consumption regulations. The vehicle makers have been developing future vehicles such as electric vehicles (EV), hybrid electric vehicles (HEV), and fuel cell electric vehicles (FCEV).

Since the future vehicles have technical restrictions such as weight and cost, the vehicle manufacturers are forced to regularly follow up for meeting exhaust gas regulations and improving fuel consumption performance and are competing desperately to commercialize the hybrid electric vehicles into practical use.

The hybrid electric vehicles are vehicles using more than two power sources, gasoline engines or diesel engines using fossil fuel and motor/generators driven by electrical energy are mainly used as the two power sources of the hybrid electric vehicles.

The hybrid electric vehicle uses the motor/generator having relatively low-speed torque characteristics as a main power source at low-speed and uses an engine having relatively high-speed torque characteristics as a main power source at high-speed.

Since the hybrid electric vehicle stops the engine using the fossil fuel and uses the motor/generator at a low-speed region, fuel consumption may be improved and exhaust gas may be reduced.

The power transmission system of a hybrid electric vehicle is classified into a single-mode type and a multi-mode type.

Although a torque delivery apparatus such as a clutch or a brake for shift control is not necessary, fuel consumption is high due to deterioration of efficiency at a high-speed region and an additional torque multiplication device is required for a large vehicle according to the single-mode type. Since the multi-mode type has high efficiency at the high-speed region and is able to multiply torque autonomously, the multi-mode type is applied as the power transmission system of a hybrid electric vehicle, which has been under continuous investigation.

The power transmission system of the multi-mode type includes a plurality of planetary gear sets, a plurality of motor/generators, a plurality of torque delivery apparatus controlling rotation elements of the planetary gear sets, and a battery used as a power source of the motor/generators.

The power transmission system of the multi-mode type has different operating mechanisms depending on connections of the planetary gear sets, the motor/generators, and the torque delivery apparatus.

In addition, the power transmission system of the multi-mode type has different features such as durability, power delivery efficiency, and size depending on the connections of the planetary gear sets, the motor/generators, and the torque delivery apparatus. Therefore, designs for the connection structure of the power transmission system of a hybrid electric vehicle have been under continuous investigation to achieve robust and compact power transmission system having no power loss.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide power transmission system of a hybrid electric vehicle having advantages of reducing electric load and using maximum power of an engine by focusing on mechanical power delivery path when splitting engine power, decreasing the number of mode conversions when starting the vehicle, and minimizing change in rotation speed of all the rotation elements when converting modes.

A power transmission system of a hybrid electric vehicle according to an aspect of the present disclosure may include an input shaft receiving torque of an engine, and an output shaft disposed in parallel with the input shaft. A first planetary gear set is disposed on the input shaft and includes a first rotation element connected to a first motor/generator, a second rotation element is operated as an output element, and a third rotation element is directly connected to the input shaft. A second planetary gear set is disposed on the output shaft and includes a fourth rotation element connected to a second motor/generator, a fifth rotation element is directly connected to the second rotation element through an externally-meshing gear and connected to the output shaft, and a sixth rotation element is selectively connected to the first rotation element through an externally-meshing gear and selectively connected to a transmission housing. A power transmission system of a hybrid electric vehicle further includes a direct-coupling device connecting two rotation elements among three rotation elements of the second planetary gear set, transfer gears connecting two rotation elements of the first planetary gear set with two rotation elements of the second planetary gear set, respectively. Friction elements are disposed selectively connecting a selected rotation element to a selected transfer gear or selectively connecting a selected rotation element to the transmission housing.

In the exemplary embodiments, the first planetary gear set may be a single pinion planetary gear set having a first sun gear being the first rotation element, a first planet carrier being the second rotation element, and a first ring gear being the third rotation element. The second planetary gear set may be a single pinion planetary gear set having a second sun gear being the fourth rotation element, a second planet carrier being the fifth rotation element, and a second ring gear being the sixth rotation element.

In the exemplary embodiments, the first planetary gear set may be a double pinion planetary gear set having a first sun gear being the first rotation element, a first ring gear being the second rotation element, and a first planet carrier being the third rotation element. The second planetary gear set may be a single pinion planetary gear set having a second sun gear being the fourth rotation element, a second planet carrier being the fifth rotation element, and a second ring gear being the sixth rotation element.

In the exemplary embodiments, the first planetary gear set may be a single pinion planetary gear set having a first sun gear being the first rotation element, a first planet carrier being the second rotation element, and a first ring gear being the third rotation element. The second planetary gear set may be a double pinion planetary gear set having a second sun gear being the fourth rotation element, a second ring gear being the fifth rotation element, and a second planet carrier being the sixth rotation element.

In the exemplary embodiments, the direct-coupling device may be a first clutch disposed between the fourth rotation element and the sixth rotation element.

In the exemplary embodiments, the direct-coupling device may be a first clutch disposed between the fourth rotation element and the fifth rotation element.

In the exemplary embodiments, the direct-coupling device may be a first clutch disposed between the fifth rotation element and the sixth rotation element.

The transfer gears may include a first transfer gear disposed between the second rotation element and the fifth rotation element, and a second transfer gear disposed between the first rotation element and the sixth rotation element.

In the exemplary embodiments, the friction elements may include a brake disposed between the sixth rotation element and the transmission housing, and a second clutch disposed between the first rotation element and the second transfer gear.

In the exemplary embodiments, the friction elements may include a brake disposed between the sixth rotation element and the transmission housing, and a second clutch disposed between the sixth rotation element and the second transfer gear.

The direct-coupling device may include a first clutch, and the friction elements may include a brake and a second clutch, wherein the brake is operated at a first electric vehicle (EV) mode, the first clutch is operated at a second EV mode, the brake is operated at a first hybrid input split mode, the first clutch is operated at a second hybrid input split mode, the second clutch is operated at a hybrid compound split mode, the second clutch and the brake are operated at a first engine mode, and the first clutch and the second clutch are operated at a second engine mode.

A power transmission system of a hybrid electric vehicle according to another aspect of the present disclosure may include an input shaft receiving torque of an engine, and an output shaft disposed in parallel with the input shaft. A first planetary gear set is disposed on the input shaft and includes a first rotation element connected to a first motor/generator, and a second and a third rotation element are directly connected to the input shaft. A second planetary gear set is disposed on the output shaft, and includes a fourth rotation element connected to a second motor/generator, a fifth rotation element is connected to the second rotation element and the output shaft, and a sixth rotation element is selectively connected to the first rotation element and a transmission housing. A first clutch connects two rotation elements among three rotation elements of the second planetary gear set. A first transfer gear is disposed between the second rotation element and the fifth rotation element, and a second transfer gear is disposed between the first rotation element and the sixth rotation element. Friction elements include a brake and a second clutch.

In the exemplary embodiments, the first planetary gear set may be a single pinion planetary gear set having a first sun gear being the first rotation element, a first planet carrier being the second rotation element, and a first ring gear being the third rotation element. The second planetary gear set may be a single pinion planetary gear set having a second sun gear being the fourth rotation element, a second planet carrier being the fifth rotation element, and a second ring gear being the sixth rotation element.

In the exemplary embodiments, the first planetary gear set may be a double pinion planetary gear set having a first sun gear being the first rotation element, a first ring gear being the second rotation element, and a first planet carrier being the third rotation element. The second planetary gear set may be a single pinion planetary gear set having a second sun gear being the fourth rotation element, a second planet carrier being the fifth rotation element, and a second ring gear being the sixth rotation element.

In the exemplary embodiments, the first planetary gear set may be a single pinion planetary gear set having a first sun gear being the first rotation element, a first planet carrier being the second rotation element, and a first ring gear being the third rotation element. The second planetary gear set may be a double pinion planetary gear set having a second sun gear being the fourth rotation element, a second ring gear being the fifth rotation element, and a second planet carrier being the sixth rotation element.

In the exemplary embodiments, the first clutch may be disposed between the fourth rotation element and the sixth rotation element.

In the exemplary embodiments, the first clutch may be disposed between the fourth rotation element and the fifth rotation element.

In the exemplary embodiments, the first clutch may be disposed between the fifth rotation element and the sixth rotation element.

In the exemplary embodiments, the friction elements may include a brake disposed between the sixth rotation element and the transmission housing, and a second clutch disposed between the first rotation element and the second transfer gear.

In the exemplary embodiments, the friction elements may include a brake disposed between the sixth rotation element and the transmission housing, and a second clutch disposed between the sixth rotation element and the second transfer gear.

BRIEF DESCRIPTION OF THE DRAWINGS

FIG. 2 is an operational chart of friction elements at each mode applied to a power transmission system according to the first exemplary embodiment of the present disclosure.

FIG. 3A is a lever diagram of a power transmission system at the first electric vehicle (EV) mode according to the first exemplary embodiment of the present disclosure.

FIG. 3B is a lever diagram of a power transmission system at the second EV mode according to the first exemplary embodiment of the present disclosure.

FIG. 4A is a lever diagram of a power transmission system at the first hybrid input split mode according to the first exemplary embodiment of the present disclosure.

FIG. 6A is a lever diagram of a power transmission system at the first engine mode according to the first exemplary embodiment of the present disclosure.

FIG. 6B is a lever diagram of a power transmission system at the second engine mode according to the first exemplary embodiment of the present disclosure.

FIG. 11 is a schematic diagram of a power transmission system according to the sixth exemplary embodiment of the present disclosure.

DETAILED DESCRIPTION

Figure 1:
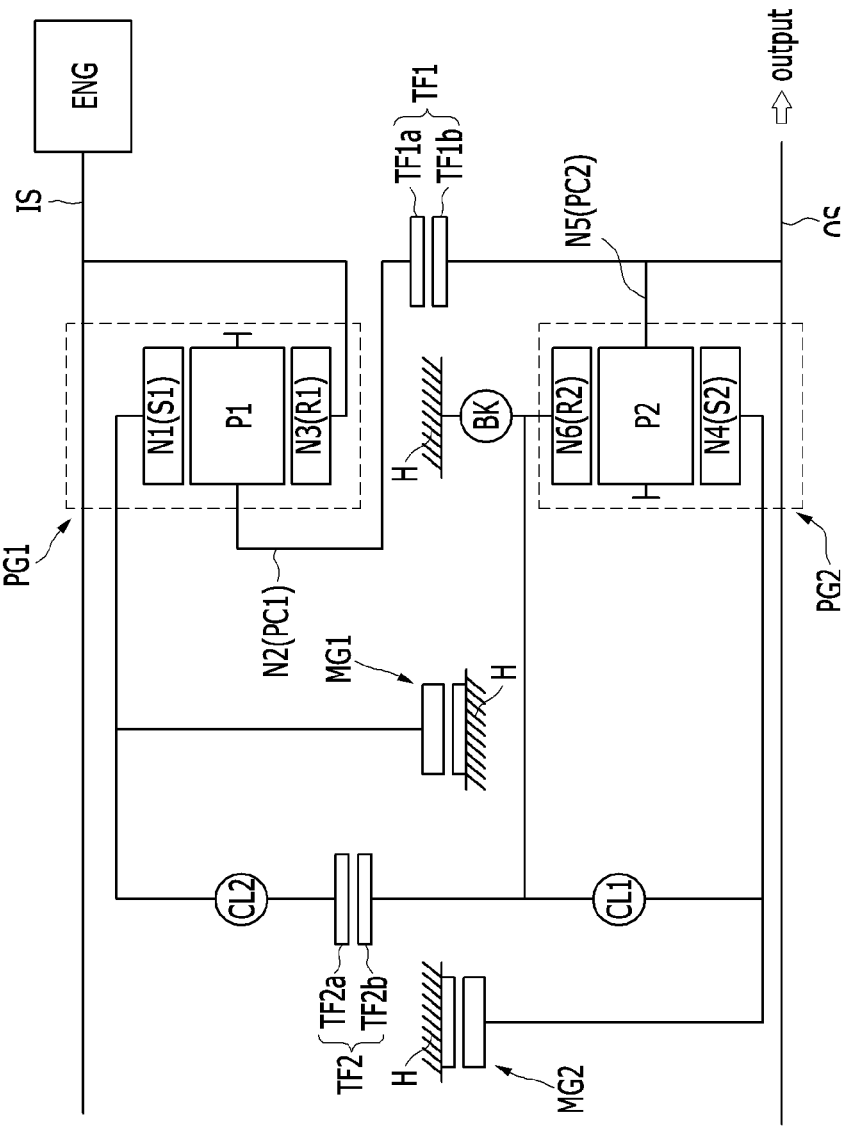
FIG. 1 is a schematic diagram of a power transmission system according to the first exemplary embodiment of the present disclosure.

Exemplary embodiments of the present disclosure will hereinafter be described in detail with reference to the accompanying drawings.

Description of components that are not necessary for explaining the present exemplary embodiment will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmission system according to the first exemplary embodiment of the present disclosure.

Referring to FIG. 1, a power transmission system of a hybrid electric vehicle according to the first exemplary embodiment of the present disclosure includes a first planetary gear set PG1 disposed on an input shaft IS, a second planetary gear set PG2 disposed on an output shaft OS in parallel with the input shaft IS, two transfer gears TF1 and TF2, friction elements consisting of two clutches CL1 and CL2 and one brake BK, and two motor/generators MG1 and MG2.

The first and second planetary gear sets PG1 and PG2 convert torque of an engine ENG input from the input shaft IS and torque of the first and second motor/generators MG1 and MG2 and output the converted torque through the output shaft OS.

The input shaft IS is an input member and receives a torque from the engine ENG. The output shaft OS is an output member and delivers a driving torque to a driving wheel through a differential apparatus (not shown).

The first planetary gear set PG1 is a single pinion planetary gear set and includes a first sun gear S1 being a first rotation element N1, a first planet carrier PC1 rotatably supporting a first pinion P1 externally meshed with the first sun gear S1 and being a second rotation element N2, and a first ring gear R1 internally meshed with the first pinion P1 and being a third rotation element N3.

The second planetary gear set PG2 is a single pinion planetary gear set and includes a second sun gear S2 being a fourth rotation element N4, a second planet carrier PC2 rotatably supporting a second pinion P2 externally meshed with the second sun gear S2 and being a fifth rotation element N5, and a second ring gear R2 internally meshed with the second pinion P2 and being a sixth rotation element N6.

The third rotation element N3 of the first planetary gear set PG1 is directly connected to the input shaft IS, and the fifth rotation element N5 of the second planetary gear set PG2 is directly connected to the output shaft OS. In addition, the rotation elements of the first planetary gear set PG1 are connected to the rotation elements of the second planetary gear set PG2 and a transmission housing H through first and second transfer gears TF1 and TF2, first and second clutches CL1 and CL2, and a brake BK.

The first and second transfer gears TF1 and TF2 respectively have first and second transfer drive gears TF1a and TF2a and first and second transfer driven gear TF1b and TF2b externally meshed with each other.

The first transfer gear TF1 externally connects the second rotation element N2 with the fifth rotation element N5.

The second transfer gear TF2 externally connects the first rotation element N1 with the sixth rotation element N6.

Therefore, the rotation elements connected with each other through the first and second transfer gears TF1 and TF2 rotate in opposite direction to each other according to gear ratios of the first and second transfer gears TF1 and TF2.

The first and second clutches CL1 and CL2 and the brake BK are the friction elements. The first clutch CL1 selectively connects the fourth rotation element N4 with the sixth rotation element N6, and the second clutch CL2 selectively connects the first rotation element N1 with the second transfer gear TF2. The first clutch CL1 is a direct-coupling device which selectively connects two rotation elements of the second planetary gear set PG2. Therefore, the second planetary gear set PG2 becomes a direct-coupling state selectively, and the second clutch CL2 selectively delivers torque of the first rotation element N1 to the sixth rotation element N6.

In addition, the brake BK selectively connects the sixth rotation element N6 with the transmission housing H.

The friction elements consisting of the first and second clutches CL1 and CL2 and the brake BK may be conventional multi-plate friction elements of wet type that are operated by hydraulic pressure.

The first motor/generator MG1 and the second motor/generator MG2 are independent power sources and are operated as a motor and a generator. The first motor/generator MG1 is connected to the first rotation element N1 of the first planetary gear set PG1 so as to supply torque to the first rotation element N1 or to generate electricity by torque of the first rotation element N1.

The second motor/generator MG2 is connected to the fourth rotation element N4 of the second planetary gear set PG2 so as to supply torque to the fourth rotation element N4 or to generate electricity by torque of the fourth rotation element N4.

Stators of the first motor/generator MG1 and the second motor/generator MG2 are fixed to the transmission housing H, and rotors of the first motor/generator MG1 and the second motor/generator MG2 are connected respectively to the first rotation element N1 and the fourth rotation element N4.

FIG. 2 is an operational chart of friction elements at each mode applied to a power transmission system according to the first exemplary embodiment of the present disclosure.

Referring to FIG. 2, a first electric vehicle (EV) mode is achieved by operating the brake BK.

A second EV mode is achieved by operating the first clutch CL1. A first hybrid input split mode is achieved by operating the brake BK. A second hybrid input split mode is achieved by operating the first clutch CL1. A hybrid compound split mode is achieved by operating the second clutch CL2. A first engine mode is achieved by operating the second clutch CL2 and the brake BK. A second engine mode is achieved by operating the first clutch CL1 and the second clutch CL2.

As described above, the power transmission system can realize two EV modes, two hybrid input split modes, one hybrid compound split mode and two engine modes.

FIGS. 3A, 3B, 4A, 4B, 5, 6A and 6B are lever diagrams of the power transmission system according to the first exemplary embodiment of the present disclosure for explaining each mode by lever analysis method.

Referring to FIGS. 3A, 3B, 4A, 4B, 5, 6A and 6B, three vertical lines of the first planetary gear set PG1 are set as the first, second, and third rotation elements N1, N2, and N3. Three vertical lines of the second planetary gear set PG2 are set as the sixth, the fifth, the fourth rotation elements N6, N5, and N4 from the left to the right. A middle horizontal line represents a rotation speed of "0", upper horizontal lines represent positive rotation speeds, and lower horizontal lines represent negative rotation speeds.

The negative rotation speeds mean that the rotational elements are rotated in an opposite direction of the rotating direction of the engine ENG since the first planetary gear set PG1 and the second planetary gear set PG2 are externally meshed with each other through the first and second transfer gears TF1 and TF2 without an idling gear.

In addition, distances between the vertical lines of the first and second planetary gear sets PG1 and PG2 are set according to gear ratios (teeth number of a sun gear/teeth number of a ring gear) of the first and second planetary gear sets PG1 and PG2.

[First EV Mode]

FIG. 3A is lever diagram at the first EV mode.

The EV mode is a mode where power of a battery is supplied to a motor/generator in a stopped state of an engine such that a vehicle is driven by power of the motor/generator. Since the engine is stopped, fuel economy may be enhanced, and the vehicle can move rearward without an additional reverse speed device at the EV mode.

The EV mode is utilized when the vehicle starts in a stopped state or the vehicle runs at low speed. Reduced gear ratio where the power source rotates faster than an output member is required for assisting hill-start or quick acceleration.

Under such conditions, the sixth rotation element N6 is operated as a fixed element by operation of the brake BK, and the second motor/generator MG2 inputs torque of the second motor/generator MG2 to the fourth rotation element N4 at the first EV mode. Therefore, the torque of the second motor/generator MG2 is changed according to the gear ratio of the second planetary gear set PG2, and driving torque is output through the fifth rotation element N5.

Here, the first planetary gear set PG1 is not involved in shifting. However, the third rotation element N3 is stopped together with the engine, and the second rotation element N2 is connected to the fifth rotation element N5 through the first transfer gear TF1. Therefore, the first and second rotation elements N1 and N2 are idling.

[Second EV Mode]

FIG. 3B is a lever diagram at the second EV mode.

Efficiency of the motor/generator changes according to rotation speed and torque thereof. Therefore, conversion ratio of electrical energy to mechanical energy changes according to the rotation speed and the torque of the motor/generator even with the same amount of current.

Current of the battery used at EV mode is generated by burning fuel in the engine or being accumulated by regenerative braking, and the efficient use of the accumulated energy has a direct effect on enhancement of fuel economy.

For this reason, a transmission realizing more than two shift-speeds is increasingly employed in the electric vehicle, and the hybrid electric vehicle realizing the EV mode having more than two shift-speeds is advantageous. Therefore, the exemplary embodiment of the present disclosure may realize two EV modes.

Shifting processes to the second EV mode are as follows. If vehicle speed increases while the vehicle drives at the first EV mode, efficiency of the second motor/generator MG2 is deteriorated. At this time, if the brake BK is released, and the first clutch CL1 is operated at a point where the efficiency of the second motor/generator MG2 is bad, the second EV mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed, and the driving torque is output through the fifth rotation element N5.

Here, the first planetary gear set PG1 is not involved in shifting. However, the third rotation element N3 is stopped together with the engine, and the first and second rotation elements N1 and N2 are idling.

[First Hybrid Input Split Mode]

FIG. 4A is a lever diagram at the first hybrid input split mode.

The torque of the engine is delivered to the output member through mechanical path and electrical path at the hybrid input split mode, which is done by the planetary gear set. Since the engine and the motor/generator connected to the planetary gear set can control their rotation speeds regardless of the vehicle speed, the power transmission system at the hybrid input split mode is operated as an electric continuous variable transmission.

The speed and the torque of the engine are fixed at given vehicle speed in a conventional transmission, but the speed and the torque of the engine can be changed freely at the given vehicle speed in the electric continuous variable transmission. Therefore, driving efficiency of the engine may be maximized and fuel economy may be enhanced.

Shifting processes to the first hybrid input split mode are as follows. The second rotation element N2 is connected to the fifth rotation element N5 through the first transfer gear TF1, but the first and second rotation elements N1 and N2 are idling at the EV modes.

If the engine ENG is started using the first motor generator MG1 at this state, speeds of the engine ENG and the first motor/generator MG1 can be controlled regardless of the vehicle speed.

When the engine ENG and the first motor/generator MG1 are controlled, the torque of the engine and the torque of the first motor/generator MG1 are summed. The summed torque is delivered to the fifth rotation element N5 that is the output element through the first transfer gear TF1. Therefore, high driving torque may be generated.

At this time, the sixth rotation element N6 is operated as the fixed element by operation of the brake BK, the driving torque is output through the fifth rotation element N5, and the fourth rotation element N4 is idling in the second planetary gear set PG2.

Since the engine ENG and the first motor/generator MG1 can be controlled independently at the first hybrid input split mode, fuel economy and driving performance may be greatly enhanced.

[Second Hybrid Input Split Mode]

Figure 4B:
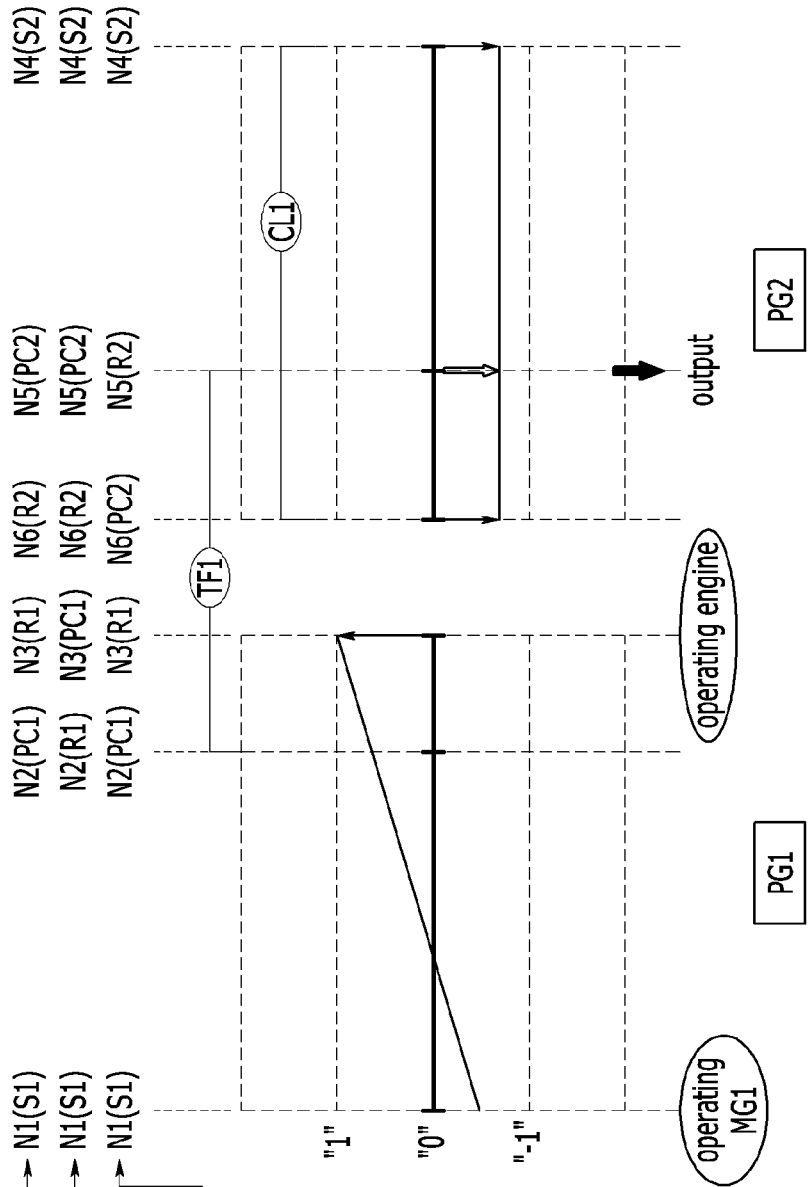
FIG. 4B is a lever diagram of a power transmission system at the second hybrid input split mode according to the first exemplary embodiment of the present disclosure.

FIG. 4B is a lever diagram at the second hybrid input split mode.

If the vehicle speed increased while the vehicle runs at the first hybrid input split mode, the brake BK is released, and the first clutch CL1 is operated so as to lower rotation speeds of all the rotation elements of the first planetary gear set PG1. Accordingly, the second hybrid input split mode begins.

Since the first clutch CL1 that is the direct-coupling device of the second planetary gear set PG2 is operated, the second planetary gear set PG2 becomes a direct-coupling state. Therefore, all the rotation elements N4, N5, and N6 of the second planetary gear set PG2 rotate with the same speed and the driving torque is output through the fifth rotation element N5.

The engine ENG and the first motor/generator MG1 can be controlled independently at the second hybrid input split mode similar as at the first hybrid input split mode, thus improving fuel economy and driving performance.

[Hybrid Compound Split Mode]

Figure 5:
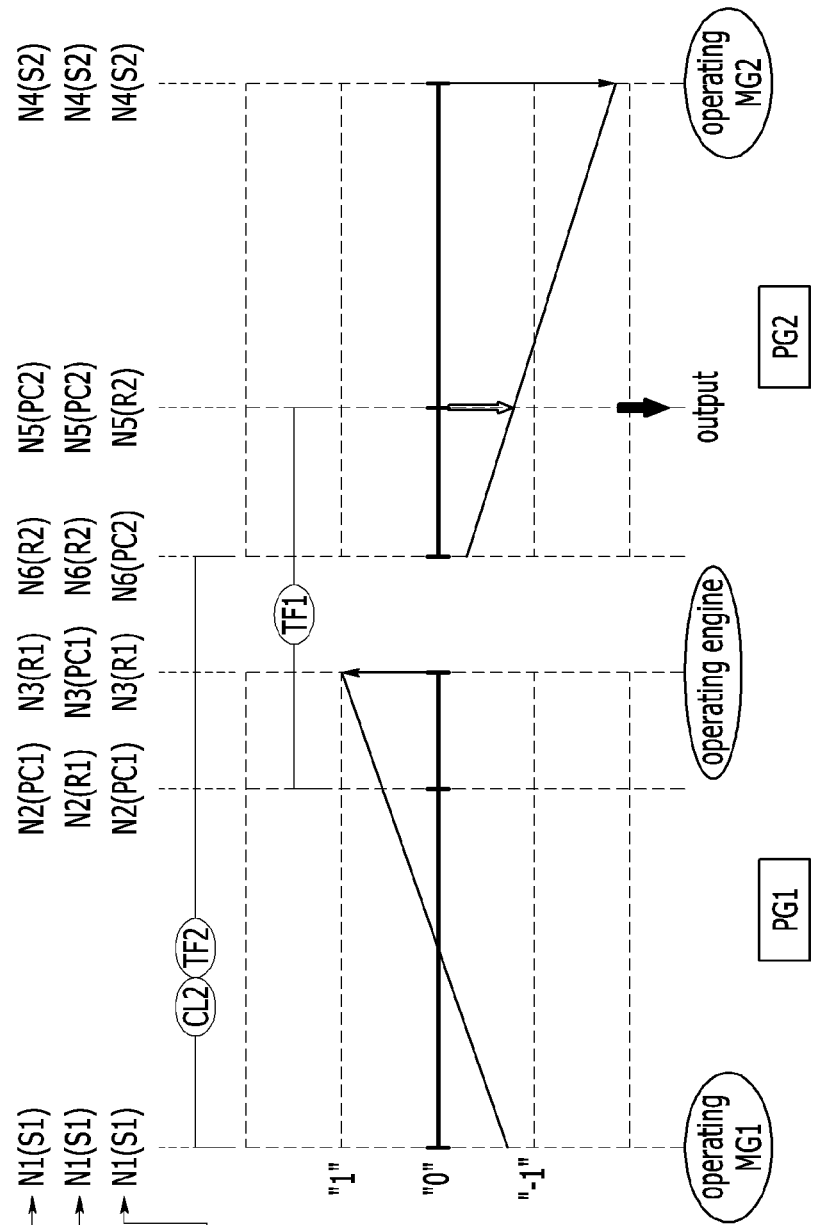
FIG. 5 is a lever diagram of a power transmission system at a hybrid compound split mode according to the first exemplary embodiment of the present disclosure.

FIG. 5 is a lever diagram at the hybrid compound split mode.

Since the rotation speed of the motor/generator connected to the output element is restricted to the vehicle speed, the motor/generator cannot be operated efficiently and capacity of the motor/generator is hard to be reduced at the hybrid input split mode.

Particularly, if the rotation speed of the motor/generator restricted to the vehicle speed is high due to high vehicle speed, efficiency of the motor/generator may be deteriorated and fuel economy may be hard to be optimized.

Under such conditions, two rotation elements of the planetary gear set connected to the engine and two rotation elements of the planetary gear set connected to the output shaft are coupled so that the rotation speed of the engine and the rotation speeds of two motor/generators are controlled regardless the vehicle speed. Thereby, the power transmission system may be operated as a continuous variable transmission and may enhance fuel economy.

When the second clutch CL2 is operated, the speed and the torque of the second motor/generator MG2 are restricted to the speed and the torque of the engine ENG through the second transfer gear TF2.

Since the second rotation element N2 is connected to the fifth rotation element N5 through the first transfer gear TF1, the speeds and the torques of the second rotation element N2 and the fifth rotation element N5 are restricted to each other.

In addition, to balance electrical energy of the first and second motor/generators MG1 and MG2, the speeds and the torques of all the rotation elements of the first and second planetary gear sets PG1 and PG2 are correlated to each other, and the power transmission system operates as the electric continuous variable transmission at the hybrid compound split mode.

The first hybrid input split mode and the second hybrid input split mode can be converted into the hybrid compound split mode. That is, when the first hybrid input split mode and the second hybrid input split mode are converted into the hybrid compound split mode, the engine ENG and the first motor/generator MG1 are controlled so that the rotation elements of the first planetary gear set PG1 synchronizes with the rotation elements of the second planetary gear set PG2. Then, the second clutch CL2 is operated.

When the first hybrid input split mode is converted into the hybrid compound split mode, the second clutch CL2 is operated, and the brake BK is released. When the second hybrid input split mode is converted into the hybrid compound split mode, the second clutch CL2 is operated, and the first clutch CL1 is released.

Since the sixth rotation element N6 cannot receive the torque at the hybrid compound split mode, sum of the torque input to the fourth rotation element N4 and the torque input to the fifth rotation element N5 are "0", respectively. That is, the torque of the second motor/generator MG2 and external torque input from the second transfer gear TF2 are balanced at the fourth rotation element N4.

In addition, torque input by drive resistance and external torque input from the first transfer gear TF1 are balanced at the fifth rotation element N5.

[First Engine Mode]

FIG. 6A is a lever diagram at the first engine mode.

Important technique in the hybrid electric vehicle for enhancing fuel economy is recovery and reuse of brake energy and control of driving point of the engine.

Controlling of the driving point of the engine accompanies conversion of mechanical energy of the engine into electric energy of the motor/generator and the electric energy of the motor/generator back into mechanical energy at the motor/generator.

During the energy conversion, not all input energy is output, thereby energy loss occurs.

Since fuel economy at the engine mode where the vehicle is driven only by the engine may be superior to that at the hybrid mode at any driving condition, the exemplary embodiments of the present disclosure provide two engine modes.

That is, the second clutch CL2 and the brake BK are engaged at the first engine mode. In this case, the rotation speed of the engine ENG is delivered to the second planetary gear set PG2 through the second transfer gear TF2 such that the fourth rotation element N4 rotates in an opposite direction to the engine ENG, and the sixth rotation element N6 is stopped. Therefore, the reduced gear ratio is formed.

Since the first and second motor/generators MG1 and MG2 do not need to provide torque, the first engine mode at which the vehicle is driven only by the engine ENG is achieved.

[Second Engine Mode]

If the vehicle speed increases while the vehicle runs at the first engine mode, the first clutch CL1 and the second clutch C2 are engaged so as to enter the second engine mode.

In this case, all the rotation elements N4, N5, and N6 of the second planetary gear set PG2 rotate with the same rotation speed by operation of the first clutch CL1.

The rotation speed of the first rotation element N1 is faster than that of the third rotation element N3 due to the gear ratio of the second transfer gear TF2. The torque of the second rotation element N2 is delivered to the fifth rotation element N5 through the first transfer gear TF1, and the driving torque is output through the fifth rotation element N5.

Therefore, the rotation speed of the fifth rotation element N5 is faster than that of the engine ENG achieving overdrive output. Since the first and second motor/generators MG1 and MG2 do not need to provide torque, the second engine mode at which the vehicle is driven only by the engine ENG is achieved.

According to the first exemplary embodiment of the present disclosure, two EV modes, two hybrid input split modes, one hybrid compound split mode, and two engine modes can be achieved by combining two planetary gear sets PG1 and PG2, two transfer gears TF1 and TF2, three friction elements CL1, CL2, and BK, and two motor/generators MG1 and MG2.

Optimum gear ratios may be set due to ease of changing gear ratios by using two transfer gears being externally-meshed gears as well as the planetary gear sets. Gear ratios can be changed according to target performance, starting performance, thus improving power delivery performance and fuel economy.

Since sufficient power performance is provided in a wide open throttle (WOT) start, converting to the engine mode is limited, and maximum power of the engine can be used in the conversion between the hybrid input split mode and the compound split mode.

The electric load may be reduced, and the maximum power of the engine may be used by giving more importance on mechanical power delivery path when splitting the engine power. Further, the number of mode conversions may be decreased when starting the vehicle, and change in rotation speed of all the rotation elements may be minimized when converting modes.

Since the engine mode is provided, the vehicle can run with high speed without electric load of the motor/generator, thus improving fuel economy.

Figure 7:
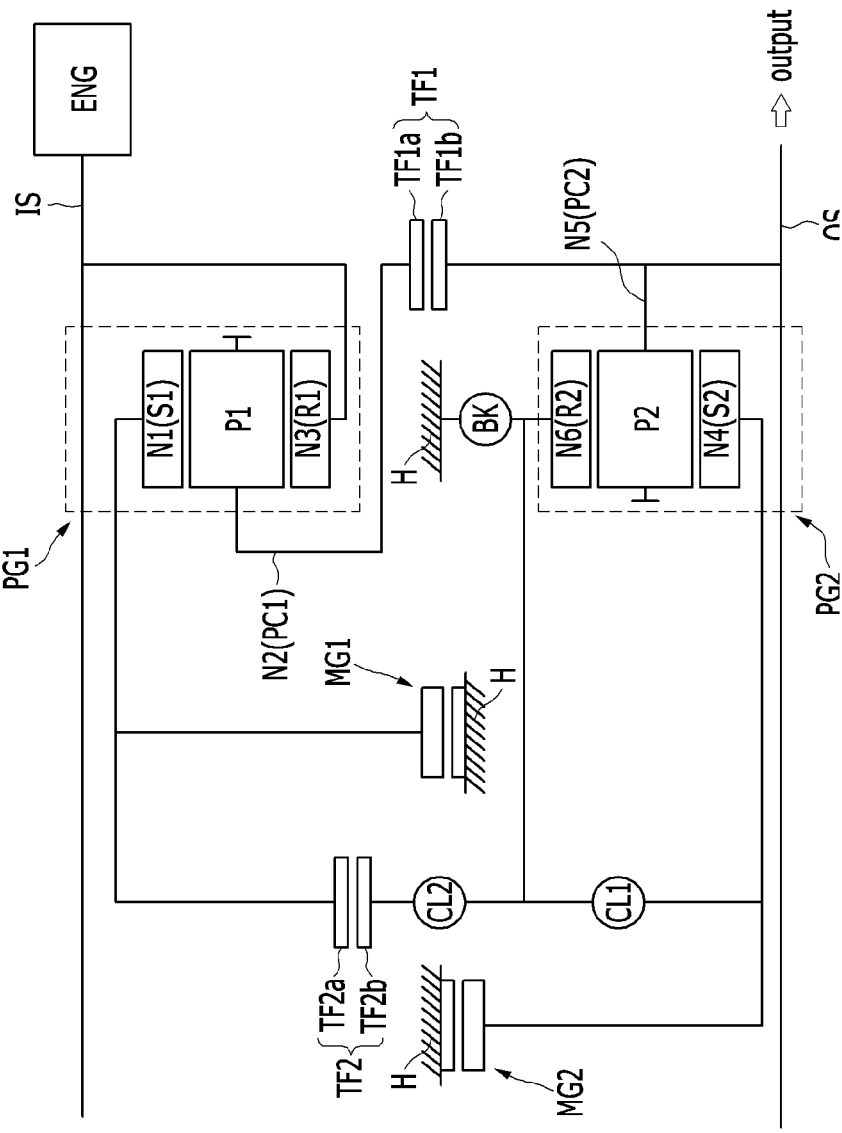
FIG. 7 is a schematic diagram of a power transmission system according to the second exemplary embodiment of the present disclosure.

FIG. 7 is a schematic diagram of a power transmission system according to the second exemplary embodiment of the present disclosure.

Referring to FIG. 7, the second clutch CL2 is disposed between the second transfer gear TF2 and the sixth rotation element N6 in the second exemplary embodiment, whereas the second clutch CL2 is disposed between the first rotation element N1 and the second transfer gear TF2 in the first exemplary embodiment.

Since functions of the second exemplary embodiment are the same as those of the first exemplary embodiment except the position of the second clutch CL2, detailed description thereof will be omitted.

Figure 8:
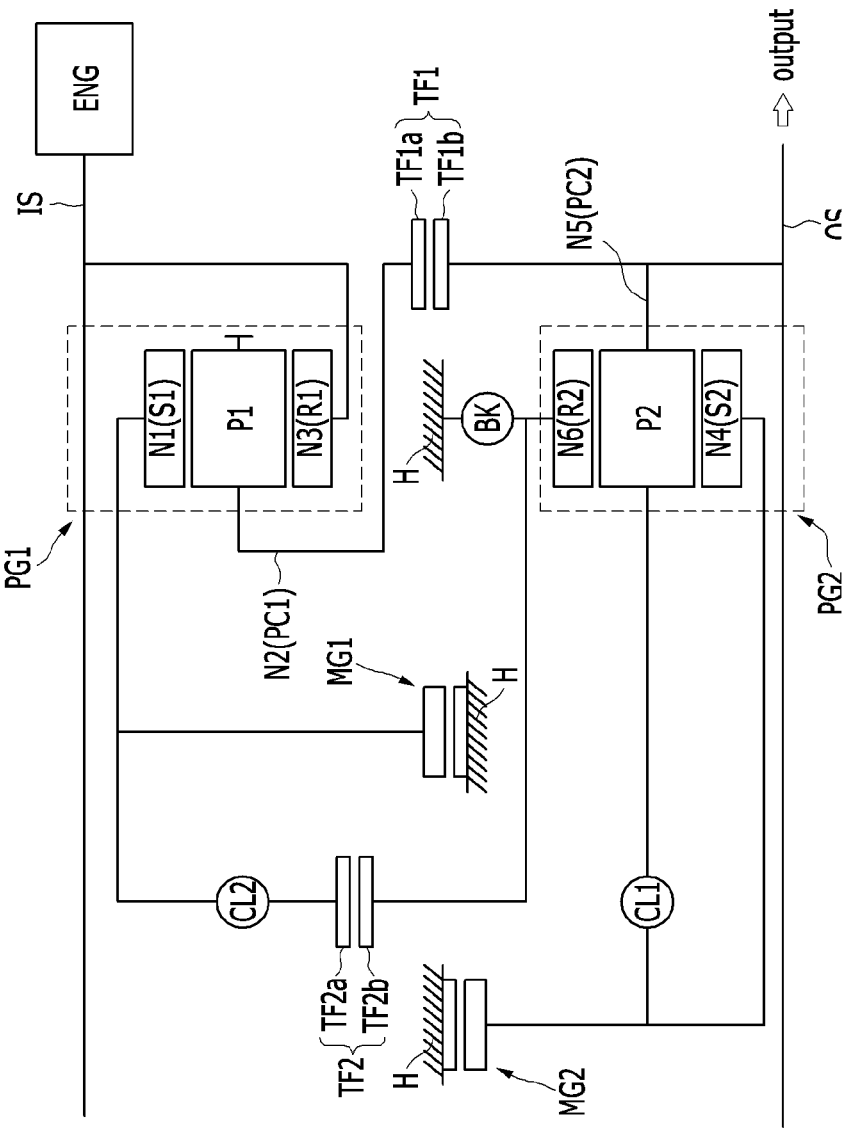
FIG. 8 is a schematic diagram of a power transmission system according to the third exemplary embodiment of the present disclosure.

FIG. 8 is a schematic diagram of a power transmission system according to the third exemplary embodiment of the present disclosure.

Referring to FIG. 8, the first clutch CL1 is disposed between the fourth rotation element N4 and the fifth rotation element N5 in the third exemplary embodiment, whereas the first clutch CL1 is disposed between the fourth rotation element N4 and the sixth rotation element N6 in the first exemplary embodiment.

Since functions of the third exemplary embodiment are the same as those of the first exemplary embodiment except the position of the first clutch CL1, detailed description thereof will be omitted.

Figure 9:
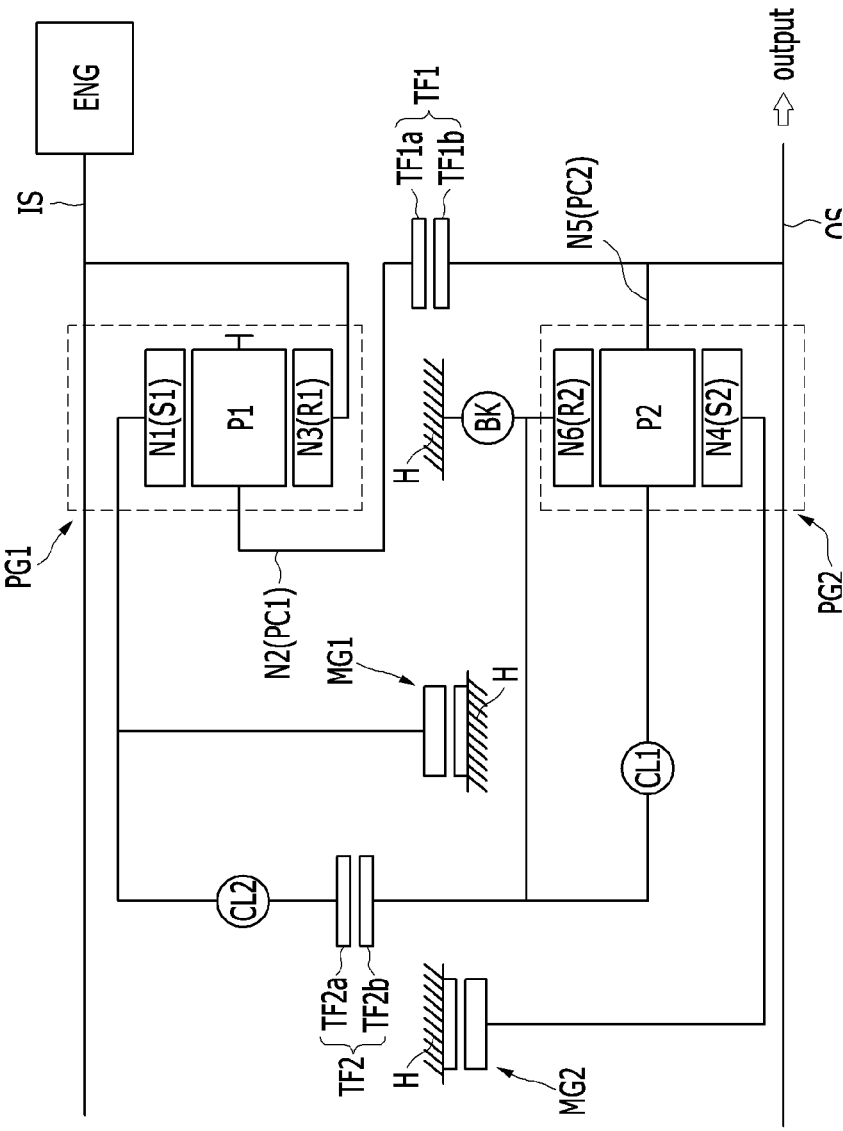
FIG. 9 is a schematic diagram of a power transmission system according to the fourth exemplary embodiment of the present disclosure.

FIG. 9 is a schematic diagram of a power transmission system according to the fourth exemplary embodiment of the present disclosure.

Referring to FIG. 9, the first clutch CL1 is disposed between the fifth rotation element N5 and the sixth rotation element N6 in the fourth exemplary embodiment, whereas the first clutch CL1 is disposed between the fourth rotation element N4 and the sixth rotation element N6 in the first exemplary embodiment.

Since functions of the fourth exemplary embodiment are the same as those of the first exemplary embodiment except the position of the first clutch CL1, detailed description thereof will be omitted.

Figure 10:
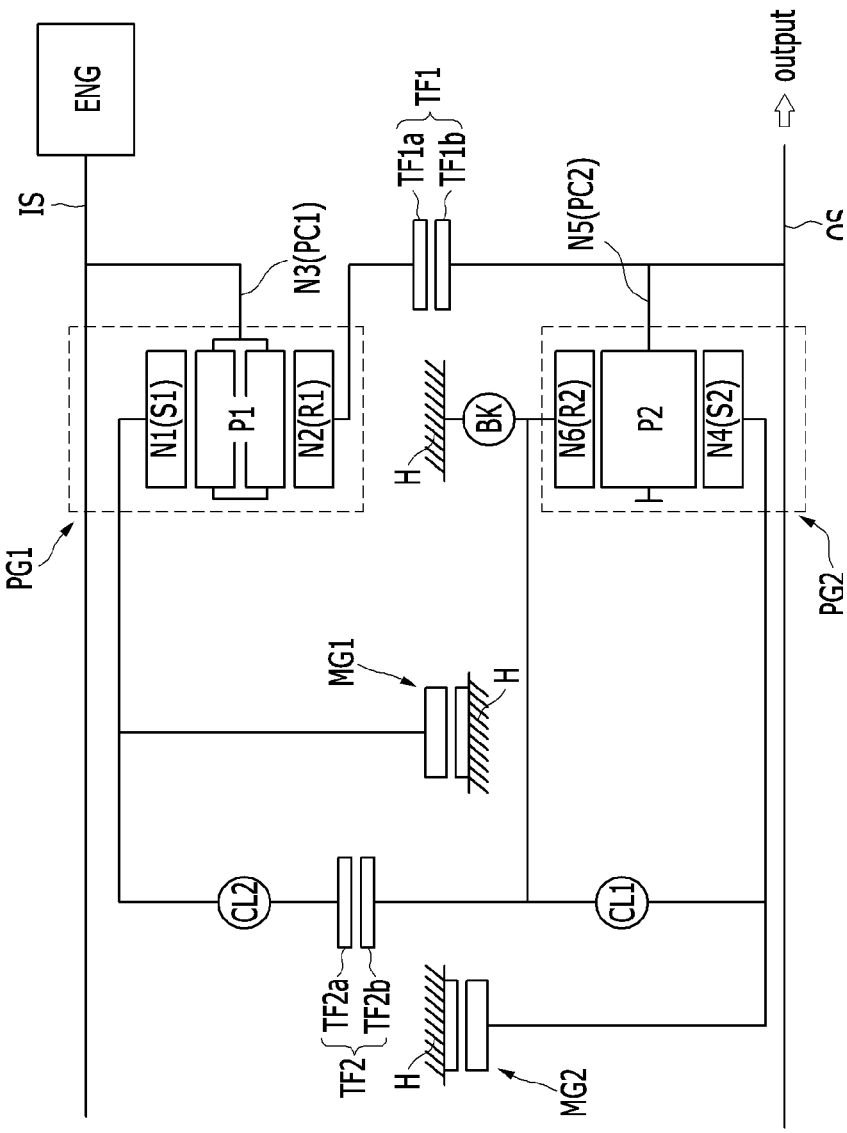
FIG. 10 is a schematic diagram of a power transmission system according to the fifth exemplary embodiment of the present disclosure.

FIG. 10 is a schematic diagram of a power transmission system according to the fifth exemplary embodiment of the present disclosure.

Referring to FIG. 10, the first planetary gear set PG1 is a double pinion planetary gear set in the fifth exemplary embodiment, whereas the first planetary gear set PG1 is the single pinion planetary gear set in the first exemplary embodiment.

The first sun gear S1 is the first rotation element N1, the first ring gear R1 is the second rotation element N2, and the first planet carrier PC1 is the third rotation element N3.

Since functions of the fifth exemplary embodiment are the same as those of the first exemplary embodiment except the rotation elements consisting of the second and third rotation elements N2 and N3, detailed description thereof will be omitted.

FIG. 11 is a schematic diagram of a power transmission system according to the sixth exemplary embodiment of the present disclosure.

Referring to FIG. 11, the second planetary gear set PG2 is a double pinion planetary gear set in the sixth exemplary embodiment, whereas the second planetary gear set PG2 is the single pinion planetary gear set in the first exemplary embodiment.

The second sun gear S2 is the fourth rotation element N4, the second ring gear R2 is the fifth rotation element N5, and the second planet carrier PC2 is the sixth rotation element N6.

Since functions of the sixth exemplary embodiment are the same as those of the first exemplary embodiment except the rotation elements consisting of the fifth and sixth rotation elements N5 and N6, detailed description thereof will be omitted.

According to the exemplary embodiments of the present disclosure, two EV modes, two hybrid input split modes, one hybrid compound split mode, and two engine modes are achieved by combining two planetary gear sets, two transfer gears, three friction elements, and two motor/generators.

Optimum gear ratios may be set due to ease of changing gear ratios by using two transfer gears being externally-meshed gears as well as the planetary gear sets. Gear ratios can be changed according to target performance, thus improving starting performance, power delivery performance and fuel economy.

Since sufficient power performance is provided in a wide open throttle (WOT) start, converting to the engine mode is limited, and maximum power of the engine can be used in the conversion between the hybrid input split mode and the compound split mode.

The electric load may be reduced, and the maximum power of the engine may be used by giving more importance on mechanical power delivery path when splitting the engine power. Further, the number of mode conversions may be decreased when starting the vehicle, and change in rotation speed of all the rotation elements may be minimized when converting modes.

Since the engine mode is provided, the vehicle can run with high speed without electric load of the motor/generator, thus improving fuel economy.

While the disclosure has been described in connection with what is presently considered to be practical exemplary embodiments, it is to be understood that the inventive concept is not limited to the disclosed embodiments, but, on the contrary, is intended to cover various modifications and equivalent arrangements included within the spirit and scope of the appended claims.

What is claimed is:

1. A power transmission system of a hybrid vehicle, comprising:
    an input shaft receiving torque of an engine;
    an output shaft disposed in parallel with the input shaft;
    a first planetary gear set disposed on the input shaft, and including a first rotation element connected to a first motor/generator, a second rotation element operated as an output element, and a third rotation element directly connected to the input shaft;
    a second planetary gear set disposed on the output shaft, and including a fourth rotation element connected to a second motor/generator, a fifth rotation element directly connected to the second rotation element through a first transfer gear set and connected to the output shaft, and a sixth rotation element selectively connected to the first rotation element through a second transfer gear set and selectively connected to a transmission housing;
    a direct-coupling device connecting two rotation elements among three rotation elements of the second planetary gear set;
    the first and second transfer gear sets connecting two rotation elements of the first planetary gear set with two rotation elements of the second planetary gear set, respectively; and
    friction elements selectively connecting a first selected rotation element among the rotation elements of the first planetary gear set and the second planetary gear set to the second transfer gear set or selectively connecting a second selected rotation element among the rotation elements of the second planetary gear set to the transmission housing.

2. The power transmission system of claim 1, wherein the first planetary gear set is a single pinion planetary gear set having a first sun gear being the first rotation element, a first planet carrier being the second rotation element, and a first ring gear being the third rotation element, and
    the second planetary gear set is a single pinion planetary gear set having a second sun gear being the fourth rotation element, a second planet carrier being the fifth rotation element, and a second ring gear being the sixth rotation element.

3. The power transmission system of claim 1, wherein the first planetary gear set is a double pinion planetary gear set having a first sun gear being the first rotation element, a first ring gear being the second rotation element, and a first planet carrier being the third rotation element, and
    the second planetary gear set is a single pinion planetary gear set having a second sun gear being the fourth rotation element, a second planet carrier being the fifth rotation element, and a second ring gear being the sixth rotation element.

4. The power transmission system of claim 1, wherein the first planetary gear set is a single pinion planetary gear set having a first sun gear being the first rotation element, a first planet carrier being the second rotation element, and a first ring gear being the third rotation element, and
    the second planetary gear set is a double pinion planetary gear set having a second sun gear being the fourth rotation element, a second ring gear being the fifth rotation element, and a second planet carrier being the sixth rotation element.

5. The power transmission system of claim 1, wherein the direct-coupling device is a first clutch disposed between the fourth rotation element and the sixth rotation element.

6. The power transmission system of claim 1, wherein the direct-coupling device is a first clutch disposed between the fourth rotation element and the fifth rotation element.

7. The power transmission system of claim 1, wherein the direct-coupling device is a first clutch disposed between the fifth rotation element and the sixth rotation element.

8. The power transmission system of claim 1, wherein the first transfer gear set, which includes a first transfer drive gear and a first transfer driven gear, is disposed between the second rotation element and the fifth rotation element, and
    the second transfer gear set, which includes a second transfer drive gear and a second transfer driven gear, is disposed between the first rotation element and the sixth rotation element.

9. The power transmission system of claim 1, wherein the friction elements comprise:
    a brake disposed between the sixth rotation element and the transmission housing; and
    a second clutch disposed between the first rotation element and the second transfer gear set.

10. The power transmission system of claim 1, wherein the friction elements comprise:
    a brake disposed between the sixth rotation element and the transmission housing; and
    a second clutch disposed between the sixth rotation element and the second transfer gear set.

11. The power transmission system of claim 1, wherein the direct-coupling device includes a first clutch and the friction elements include a brake and a second clutch, and
    wherein the brake is operated at a first EV (Electric Vehicle) mode,
    the first clutch is operated at a second EV mode,
    the brake is operated at a first hybrid input split mode,
    the first clutch is operated at a second hybrid input split mode,
    the second clutch is operated at a hybrid compound split mode,
    the second clutch and the brake are operated at a first engine mode, and
    the first clutch and the second clutch are operated at a second engine mode.

12. A power transmission system of a hybrid vehicle, comprising:
    an input shaft receiving torque of an engine;
    an output shaft disposed in parallel with the input shaft;
    a first planetary gear set disposed on the input shaft, and including a first rotation element connected to a first motor/generator, a second rotation element, and a third rotation element directly connected to the input shaft;
    a second planetary gear set disposed on the output shaft, and including a fourth rotation element connected to a second motor/generator, a fifth rotation element connected to the second rotation element and the output shaft, and a sixth rotation element selectively connected to the first rotation element and a transmission housing;
    a first clutch connecting two rotation elements among three rotation elements of the second planetary gear set;
    a first transfer gear set disposed between the second rotation element and the fifth rotation element;
    a second transfer gear set disposed between the first rotation element and the sixth rotation element; and
    friction elements including a brake and a second clutch.

13. The power transmission system of claim 12, wherein the first planetary gear set is a single pinion planetary gear set having a first sun gear being the first rotation element, a first planet carrier being the second rotation element, and a first ring gear being the third rotation element, and the second planetary gear set is a single pinion planetary gear set having a second sun gear being the fourth rotation element, a second planet carrier being the fifth rotation element, and a second ring gear being the sixth rotation element.

14. The power transmission system of claim 12, wherein the first planetary gear set is a double pinion planetary gear set having a first sun gear being the first rotation element, a first ring gear being the second rotation element, and a first planet carrier being the third rotation element, and the second planetary gear set is a single pinion planetary gear set having a second sun gear being the fourth rotation element, a second planet carrier being the fifth rotation element, and a second ring gear being the sixth rotation element.

15. The power transmission system of claim 12, wherein the first planetary gear set is a single pinion planetary gear set having a first sun gear being the first rotation element, a first planet carrier being the second rotation element, and a first ring gear being the third rotation element, and the second planetary gear set is a double pinion planetary gear set having a second sun gear being the fourth rotation element, a second ring gear being the fifth rotation element, and a second planet carrier being the sixth rotation element.

16. The power transmission system of claim 12, wherein the first clutch is disposed between the fourth rotation element and the sixth rotation element.

17. The power transmission system of claim 12, wherein the first clutch is disposed between the fourth rotation element and the fifth rotation element.

18. The power transmission system of claim 12, wherein the first clutch is disposed between the fifth rotation element and the sixth rotation element.

19. The power transmission system of claim 12, wherein the brake is disposed between the sixth rotation element and the transmission housing, and the second clutch is disposed between the first rotation element and the second transfer gear set.

20. The power transmission system of claim 12, wherein the brake is disposed between the sixth rotation element and the transmission housing, and the second clutch is disposed between the sixth rotation element and the second transfer gear set.

\* \* \* \* \*